US011081798B2

(12) United States Patent
Gurbuz et al.

(10) Patent No.: US 11,081,798 B2
(45) Date of Patent: Aug. 3, 2021

(54) LOW-COMPLEXITY FULL-DUPLEX RADIO SYSTEM WITH ENHANCED DIGITAL SELF-INTERFERENCE CANCELLATION

(71) Applicant: Sabanci Universitesi, Istanbul (TR)

(72) Inventors: Ozgur Gurbuz, Istanbul (TR); Ibrahim Tekin, Istanbul (TR); Mikail Yilan, Istanbul (TR); Hayrettin Ayar, Istanbul (TR)

(73) Assignee: SABANCI UNIVERSITESI, Istanbul (TR)

( * ) Notice: Subject to any disclaimer, the term of this patent is extended or adjusted under 35 U.S.C. 154(b) by 0 days.

(21) Appl. No.: 16/595,773

(22) Filed: Oct. 8, 2019

(65) Prior Publication Data

US 2021/0104821 A1    Apr. 8, 2021

(51) Int. Cl.
*H01Q 9/04* (2006.01)
*H01Q 13/10* (2006.01)

(52) U.S. Cl.
CPC ......... *H01Q 9/0478* (2013.01); *H01Q 9/0457* (2013.01); *H01Q 9/0492* (2013.01); *H01Q 13/106* (2013.01)

(58) Field of Classification Search
CPC .. H01Q 9/0457; H01Q 9/0478; H01Q 9/0492; H01Q 13/106
See application file for complete search history.

(56) References Cited

U.S. PATENT DOCUMENTS

| | | | |
|---|---|---|---|
| 9,742,593 B2 | 8/2017 | Moorti et al. | |
| 9,748,990 B2 | 8/2017 | Wu et al. | |
| 2013/0301487 A1* | 11/2013 | Khandani | H04B 7/0413 370/278 |
| 2017/0180160 A1* | 6/2017 | Moorti | H04L 47/29 |
| 2017/0257180 A1 | 9/2017 | Aggarwal et al. | |
| 2018/0006794 A1* | 1/2018 | Lee | H04B 1/525 |

FOREIGN PATENT DOCUMENTS

WO    WO-2018218089 A1 * 11/2018 ............... H04B 1/58

OTHER PUBLICATIONS

Choi, J.I., et al., "Achieving Single Channel, Full Duplex, Wireless Communication," dated Sep. 20, 2010, pp. 1-12, MobiCom '10, Sep. 20-24, 2010, Chicago, Illinois, USA. DOI: 10.1145/1859995.1859997.

(Continued)

*Primary Examiner* — Hoang V Nguyen
(74) *Attorney, Agent, or Firm* — Brinks Gilson & Lione

(57) ABSTRACT

A full-duplex radio system includes a monostatic antenna, digital self-interference cancellation (DSIC) and cyclic prefix noise reduction (CPNR) method and circuitry applying said method suitable for orthogonal frequency division multiplexing (OFDM) based full-duplex wireless communications. Said system, method and circuitry applying said method are implementable within the paradigm of in-band full-duplex (IBFD) monostatic antenna architecture, an embodiment of which comprises a dual-polarized, slot-coupled antenna.

8 Claims, 8 Drawing Sheets

(56) References Cited

OTHER PUBLICATIONS

Everett, E., et al., "Empowering Full-Duplex Wireless Communication by Exploiting Directional Diversity," dated Nov. 6, 2011, pp. 2002-2006, 2011 Conference Record of the Forty-Fifth Asilomar Conference on Signals, Systems, and Computers (ASILOMAR), DOI: 10.1109/ACSSC.2011.6190376.

Bharadia, D., et al., "Full Duplex Radios," dated Aug. 12, 2013, pp. 375-386, SIGCOMM 13, Proceedings of the ACM SIGCOMM 2013 Conference on SIGCOMM, Aug. 12-16, 2013, Hong Kong, China. DOI: 10.1145/2486001.2486033.

Nawaz, H., et al., "Dual-Polarized, Differential Fed Microstrip Patch Antennas With Very High Interport Isolation for Full-Duplex Communication," dated Oct. 23, 2017, pp. 7355-7360, IEEE Transactions on Antennas and Propagation, vol. 65, Iss. 12, Dec. 2017. DOI: 10.1109/TAP.2017.2765829.

Ahmed, E., et al., "All-Digital Self-interference Cancellation Technique for Full-duplex Systems," dated Feb. 27, 2015, pp. 3519-3532, IEEE Transactions on Wireless Communications, vol. 14, Iss. 7, Jul. 2015. DOI: 10.1109/TWC.2015.2407876.

Ahmed, E., et al., "Self-Interference Cancellation with Nonlinear Distortion Suppression for Full-Duplex Systems," dated Nov. 3, 2013, pp. 1199-1203, 2013 Asilomar Conference on Signals, Systems, and Computers, Nov. 3-6, 2013, DOI: 10.1109/ACSSC.2013.6810483.

\* cited by examiner

LOW-COMPLEXITY FULL-DUPLEX RADIO SYSTEM WITH ENHANCED DIGITAL SELF-INTERFERENCE CANCELLATION

1. Technical Field

This disclosure relates to systems, methods and circuitry for addressing the self-interference problem posed in full-duplex wireless communication paradigm that doubles spectral efficiency. More specifically the disclosure relates to a low-complexity full-duplex radio system using digital self-interference cancellation (DSIC) methods for orthogonal frequency division multiplexing (OFDM) oriented full-duplex systems among documented problems, an example of which is cyclic prefix noise.

2. Background Information

Smart portable devices increased the demand for wireless access as well as higher access rates thereof. Capacities of wireless systems shall be enhanced to fulfill the growing demand.

BRIEF SUMMARY

One possible solution to growing demand for access is an in-band full-duplex (IBFD) wireless communication system that improves throughput and spectral efficiency by allowing simultaneous transmission and reception at the same frequency. In the current systems, contrarily, the transmit and receive operations are isolated either by time or frequency division duplexing.

In an IBFD radio, both of desired signal (signal of interest, SoI) and the self-interference (SI) signal resulting from collocated transmitter are received at the same time and frequency. Since SI signal follows a shorter path compared to the desired signal, it is received with much higher power. To capture the desired signal and perform IBFD communication, this SI signal needs to be eliminated.

Choi et al. and Everett et al. in their respective studies titled "Achieving single channel, full-duplex wireless communication" and "Empowering full-duplex wireless communication by exploiting directional diversity" use two antennas for transmission and reception separately; whereas Bharadia et al. in "Full Duplex Radios" (ACM SIGCOMM Computer Communication Review, vol. 43, pp. 375-386, ACM, 2013) introduce an IBFD wireless radio that achieves close to theoretical doubling of the spectral efficiency measurable in throughput in deployment scenarios, which utilizes a single antenna. Nawaz and Tekin, in the publication "Dual-Polarized, Differential Fed Microstrip Patch Antennas with Very High Interport Isolation for Full-Duplex Communication" (IEEE Transactions on Antennas and Propagation, vol. 65, pp. 7355-7360, Dec. 2017) teach antennas capable of passive suppression to a very high degree.

Active self-interference cancellation techniques are performed via analog and digital techniques. Active techniques require an auxiliary transmit chain, whereas digital techniques operate at the baseband level, to construct a copy of the transmitted signal and subtract it from the received signal. Ahmed and Eltawil in their study titled "All Digital Self-Interference Cancellation Technique for Full-Duplex Systems" (IEEE Transactions on Wireless Communications, vol. 14, no. 7, pp. 3519-3532, July 2015) propose a digital suppression/cancellation method based on channel estimation, auxiliary receiver multiplication and subtraction from received signal to obtain an interference-free signal. Yet another study by them titled "Self-interference cancellation with nonlinear distortion suppression for full-duplex systems" (2013 Asilomar Conference on Signals, Systems and Computers, pp. 1199-1203, IEEE 2013) propose an iterative technique to jointly estimate the self-interference channel and the nonlinearity coefficients required to suppress the distortion signal.

Patent with document identification U.S. Pat. No. 9,742,593 (B2) discloses a method for adaptively-tuned digital self-interference cancellation. US 2017257180 (A1) discloses an apparatus and method for SIC in communication systems wherein the amount of interference is determined via channel estimation using either analog time domain cancellation, digital time domain cancellation or both, is performed responsive to a determination that the interference value does not satisfy a threshold range of an analog-to-digital converter of the receiver.

U.S. Pat. No. 9,748,990 (B2) discloses a channel estimation method based on joint training sequence and pilot in an 802.11n multi-antenna OFDM system. The method comprises channel demodulation by FFT, introducing a long training field in the preamble to estimate the channel information of a training sequence, and improving the channel information by using a weighting matrix, wherein the channel information can be directly used as the data channel value in a subcarrier; secondly, subjecting the data to cyclic shift restoration; finally, estimating a pilot channel by a local pilot value and a received signal at the pilot in order to further eliminate the influence of the frequency offset and the phase noise. The method realizes the channel estimation and the recovery operation of the received signal by using the training sequence, the weighting matrix and the pilot value, avoids a characteristic that the training sequence channel estimation error is large, realizes the combination of the training sequence, the weighting matrix and the pilot distribution, reduces the channel estimation error, and provides a simple and efficient solution for the reception of 802.11n multi-antenna OFDM.

An interesting aspect of the full-duplex radio system described is a system of novel low-complexity full-duplex radio design.

Further interesting aspects of the system include at least one monostatic antenna, a digital self-interference cancellation (DSIC) method and circuitry applying said method.

Additional interesting aspects include a low-complexity full duplex radio system, a digital self-interference cancellation (DSIC) method and circuitry applying said method, all suitable for orthogonal frequency division multiplexing (OFDM) based full-duplex wireless communications.

Another interesting aspect of the system relates to a digital self-interference cancellation (DSIC) method based on least squares time and frequency domain estimation/reconstruction techniques.

Another interesting aspect of the system relates to a DSIC method comprising cyclic prefix noise reduction (CPNR) functionality which addresses the post-DSIC periodic residual signals i.e. cyclic prefix noise.

Another interesting aspect relates to a novel low-complexity full-duplex radio design including a digital self-interference cancellation (DSIC) method and circuitry applying said method suitable for orthogonal frequency division multiplexing (OFDM) based full-duplex wireless communications. Said system, method and circuitry applying said method are implementable within the paradigm of in-band full-duplex (IBFD) communication. The disclosed DSIC method and circuitry may be utilized alongside passive SI suppression deployed at antenna level, analog SI cancellation, and/or a combination of both; as well as at least one software defined radio setting.

A software defined radio may include a radio frequency transceiver (or transmitter and receiver) and circuitry, including a processor executing logic to provide the functionality of a radio to wirelessly receive, transmit, and process radio signals and to also output audio and/or data representations of said signals for receipt by a user. The full-duplex radio system and associated functionality and circuitry described herein may be included as part of a software defined radio. Alternatively, or in addition, all or part of the full-duplex radio system described herein may be separate from a software defined radio with functionality being provided by circuitry (logic, one or more processors and memory, for example) that is external to a software defined radio and cooperatively operates therewith. For example, a portion of the functionality of the full-duplex radio system, such as at least some of the described signal processing functionality and/or the monostatic antenna may be external to the software defined radio, and another portion of the system may be internal to the software defined radio. In embodiments, circuitry representative of a RF transceiver, a baseband transmitter chain and a baseband receiver chain may be included in a software defined radio, and at least one monostatic antenna may be external to and electrically coupled with the software defined radio.

Said DSIC circuitry employing said DSIC method for in-band full-duplex (IBFD) architectures may operate between the receiver buffer of a software defined radio (IEEE 802.11g OFDM-compatible) of a dual-port antenna and the baseband receiver chain. Received signal may be initially downsampled/decimated by a decimator subcircuitry, which delivers the decimated received signal to long training sequence (LTS) correlation and packet start detection subcircuitry, subsequent to which a carrier frequency offset (CFO) correction subcircuitry doubles the output for channel estimation subcircuitry and a fast Fourier transform (FFT) subcircuitry. Outputs of said FFT and Channel Estimation circuitries, as well as a pre-interpolation transmitter signal enter a subsequent sample reconstruction subcircuitry, output thereof is delivered to an interpolation filter afterwards, producing the estimated SI signal. Said estimated SI signal is finally subtracted from the original received signal from the Rx buffer to cancel self-interference.

Said DSIC method and said circuitry employing said method also comprises a cyclic prefix noise reduction (CPNR) functionality which addresses the post-DSIC periodic residual signals i.e. ripples at the transitions between two OFDM symbols, in the cyclic prefix region. In the disclosed system, CPNR addresses cyclic prefix (CP) noise that is more severe in the frequency domain, adds a further 15 dB and 5 dB to DSIC effectiveness in frequency and time domain incarnations thereof respectively, hence the range performance of the full-duplex radio as a whole. Said CPNR operates in concordance with the DSIC method in the disclosed system within two steps of SI channel estimation and transition region reconstruction enhancement for either time or frequency domains.

BRIEF DESCRIPTION OF THE DRAWINGS

Accompanying drawings are given solely for the purpose of exemplifying a low-complexity full-duplex radio architecture with enhanced digital self-interference cancellation, whose advantages over prior art were outlined above and will be explained in brief hereinafter.

The drawings are not meant to delimit the scope of protection nor should they be referred to alone in an effort to interpret the scope identified in said claims without recourse to the technical disclosure herein.

FURTHER DESCRIPTION OF THE DRAWINGS AND THE PRESENTLY PREFERRED EMBODIMENTS

Figure 1:
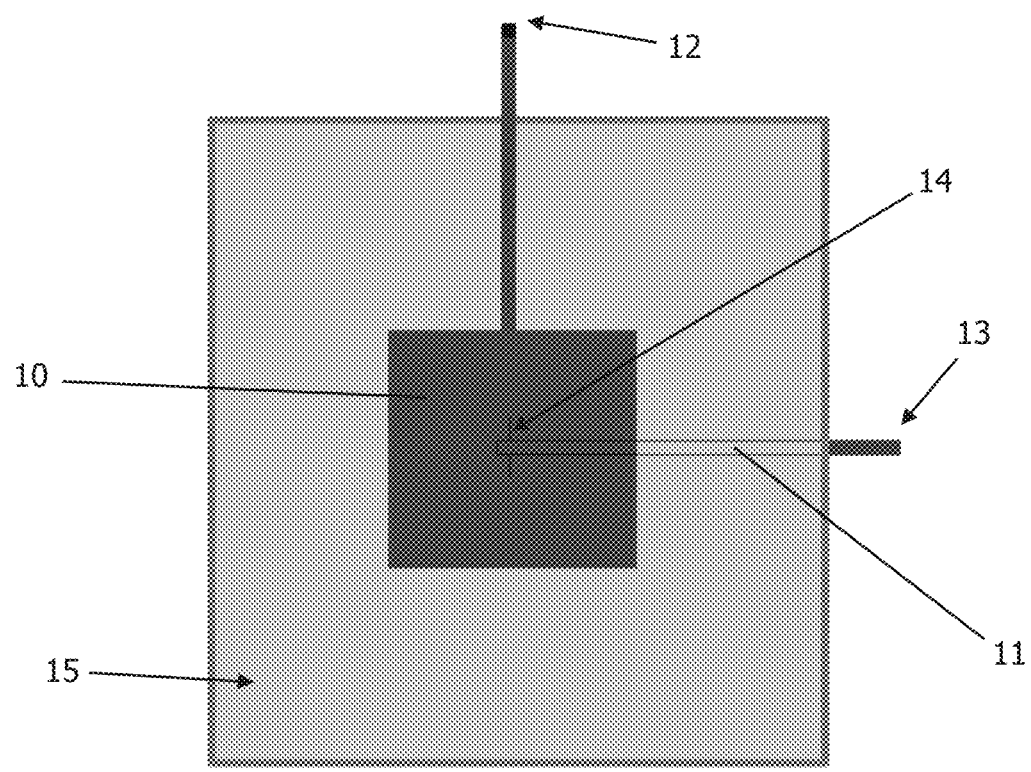

Dual-polarized hybrid-fed antenna:
10) Antenna patch
11) Microstrip feed line
12) Tx port
13) Rx port
14) Slot in GND plane
15) Ground plane
Dual-polarized differential-fed antenna:
20) Antenna patch
21) 3 dB/180° ring hybrid coupler
22) Tx port
23) Rx port
24) Microstrip line
25) 50 OHM terminal
26) Ground plane
Dual-polarized, double differential-fed antenna:
30) Antenna patch
31) 3 dB/180° ring hybrid coupler
32) Tx port
33) Rx port
34) Microstrip line
35) 50 OHM terminal
36) SMA connector
37) RF cable
38) Ground plane FIG. 1 demonstrates top view of a dual-polarized, hybrid-fed microstrip patch antenna according to example embodiments.

Figure 2:
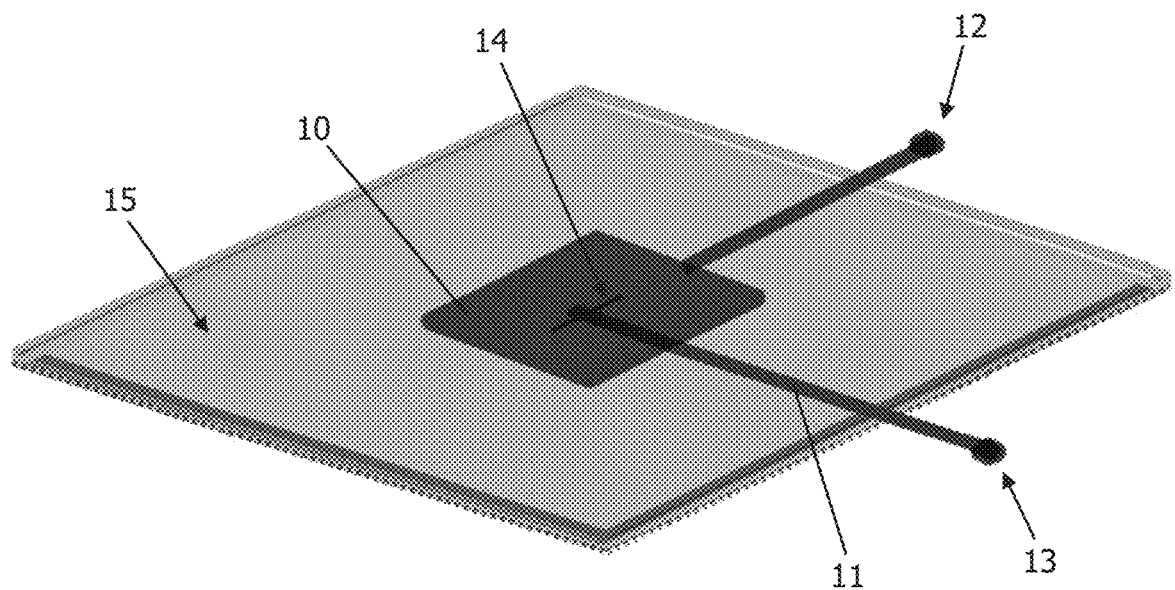

FIG. 2 demonstrates top perspective view of a dual-polarized, hybrid-fed microstrip patch antenna according to example embodiments.

Figure 3:
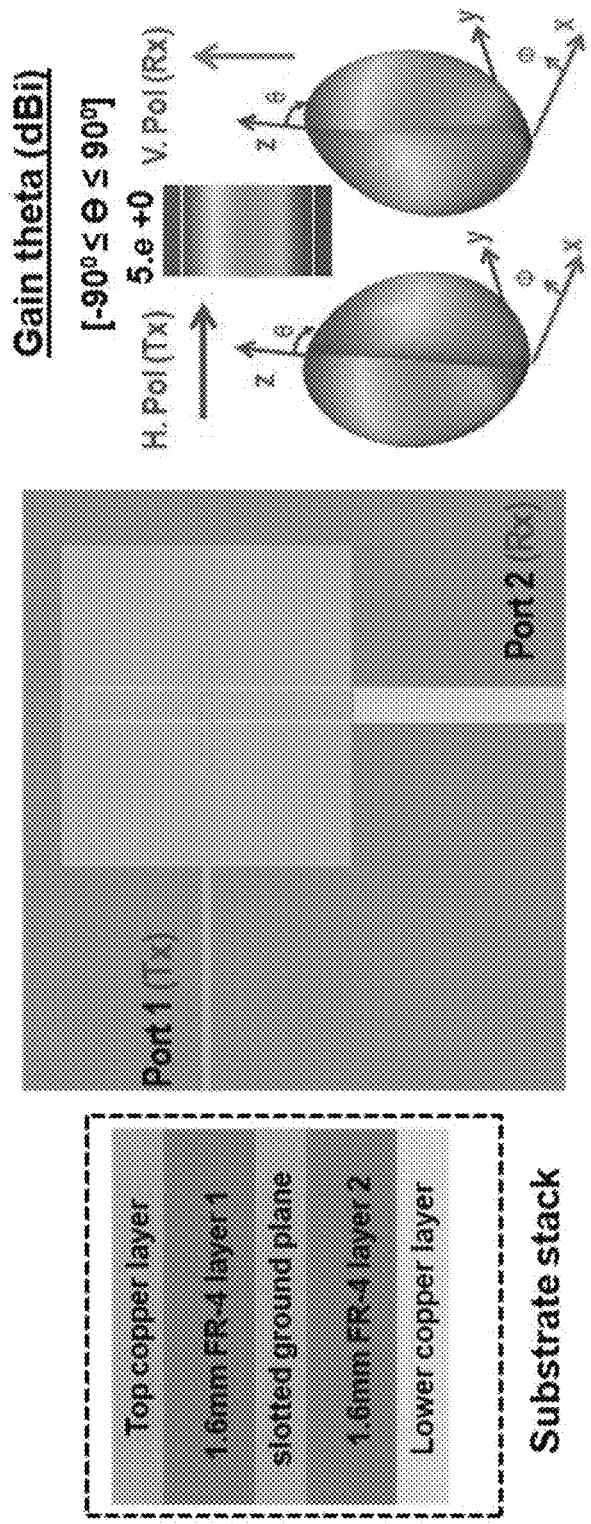

FIG. 3 demonstrates the substrate stack and the 3-D radiation pattern of a dual-polarized, hybrid-fed microstrip patch antenna according to example embodiments.

Figure 4:
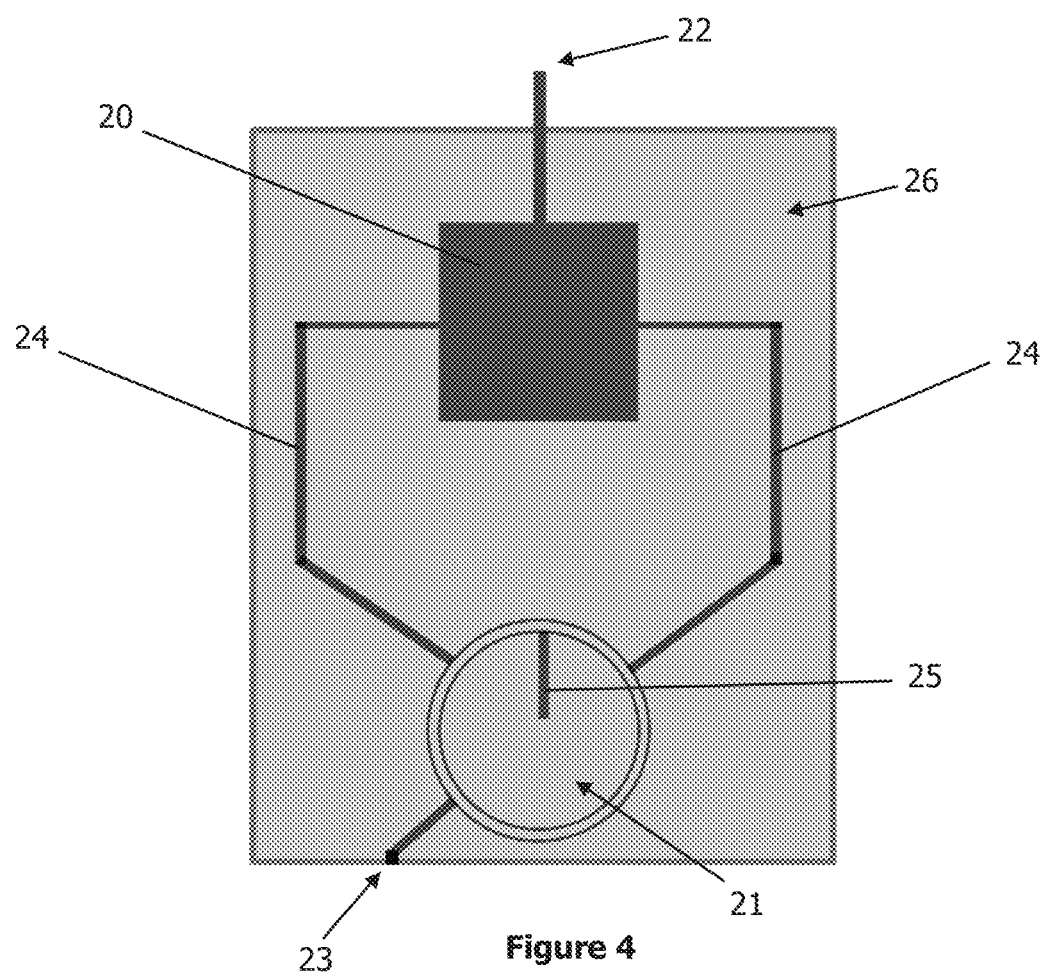

FIG. 4 demonstrates top view of a dual-polarized, differential-fed microstrip patch antenna according to example embodiments.

Figure 5:
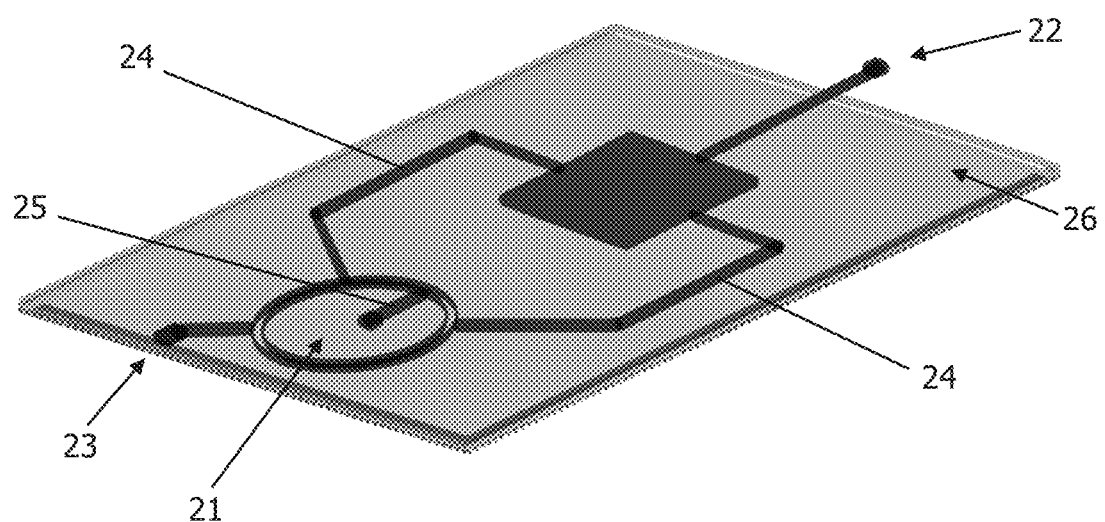

FIG. 5 demonstrates top perspective view of a dual-polarized, differential-fed microstrip patch antenna according to example embodiments.

Figure 6:
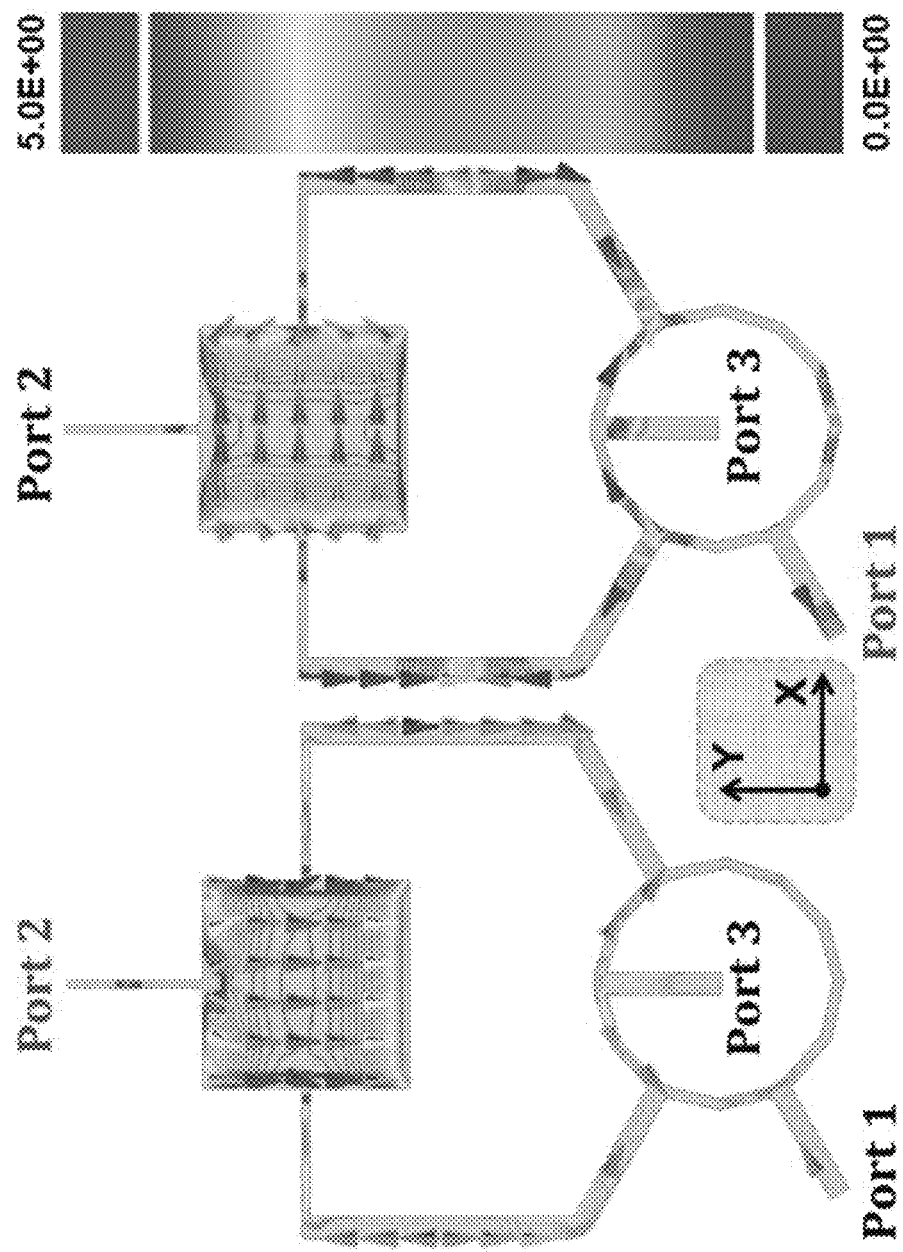

FIG. 6 demonstrates the radiation pattern of a dual-polarized, differential-fed microstrip patch antenna according to example embodiments.

Figure 7:
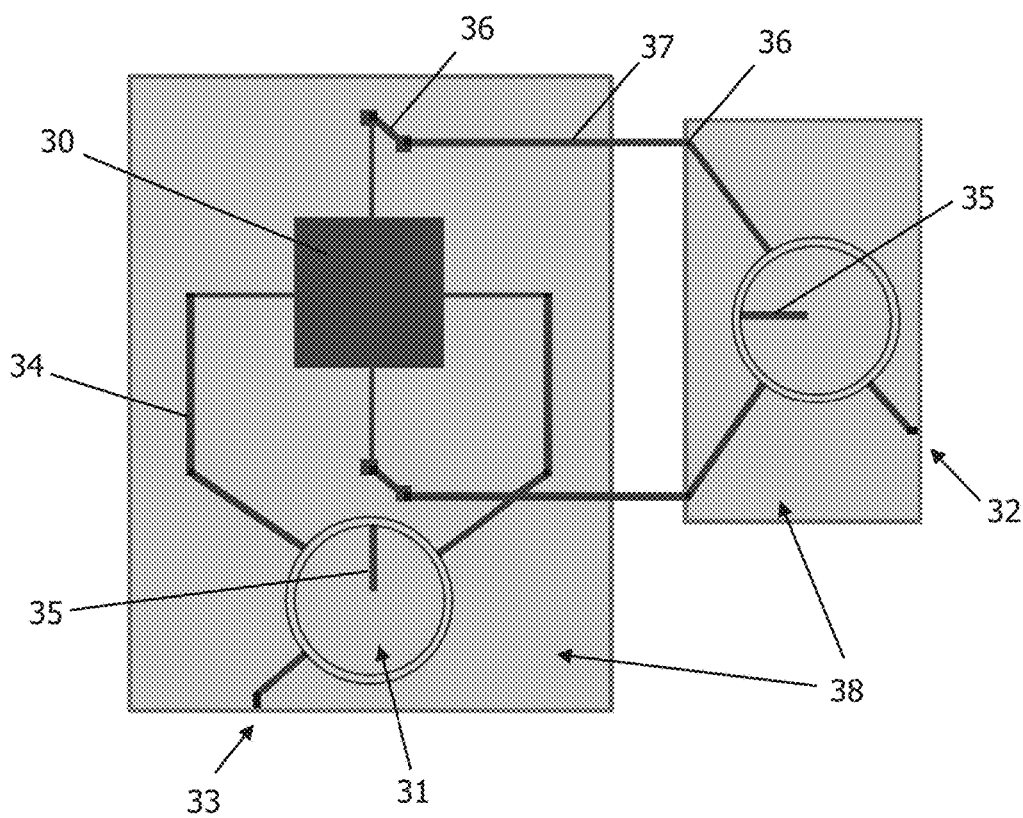

FIG. 7 demonstrates top view of a dual-polarized, double differential-fed patch antenna according to example embodiments.

Figure 8:
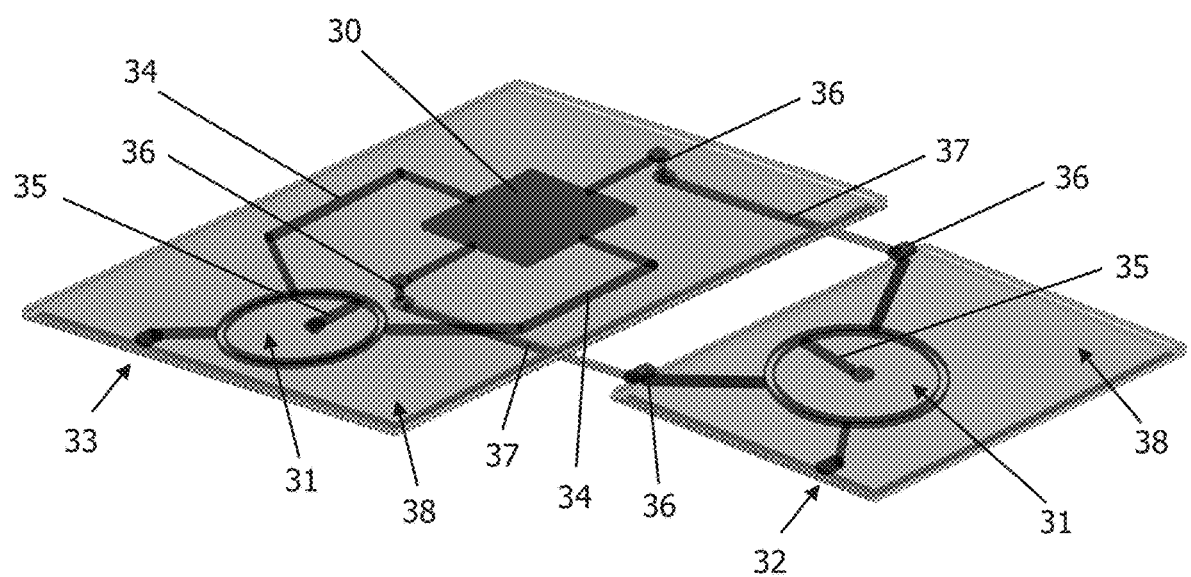

FIG. 8 demonstrates top perspective view of a dual-polarized, double differential-fed patch antenna according to example embodiments.

Figure 9:
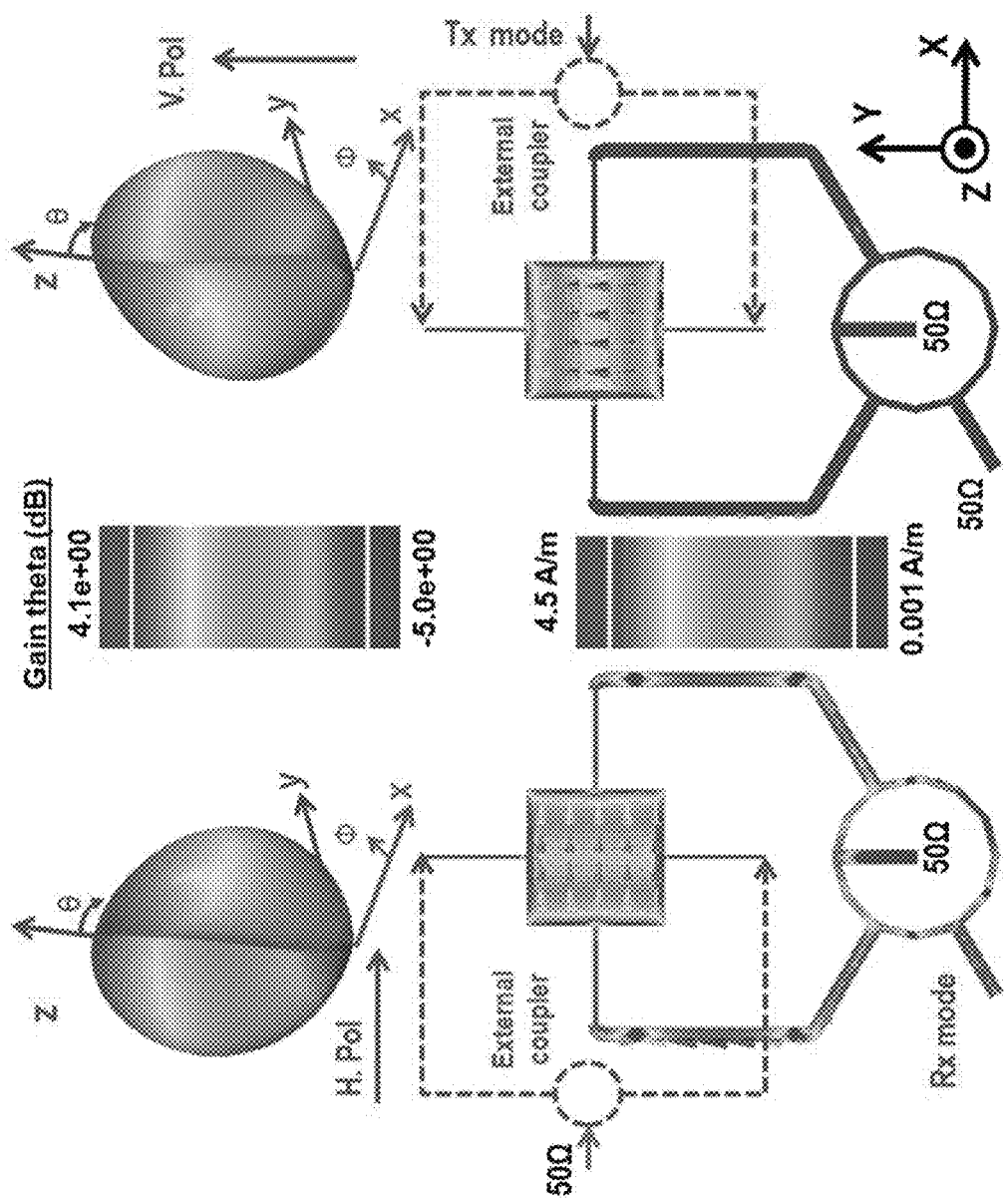

FIG. 9 demonstrates the 3-D radiation pattern of a dual-polarized, differential-fed microstrip patch antenna according to example embodiments.

Figure 10:
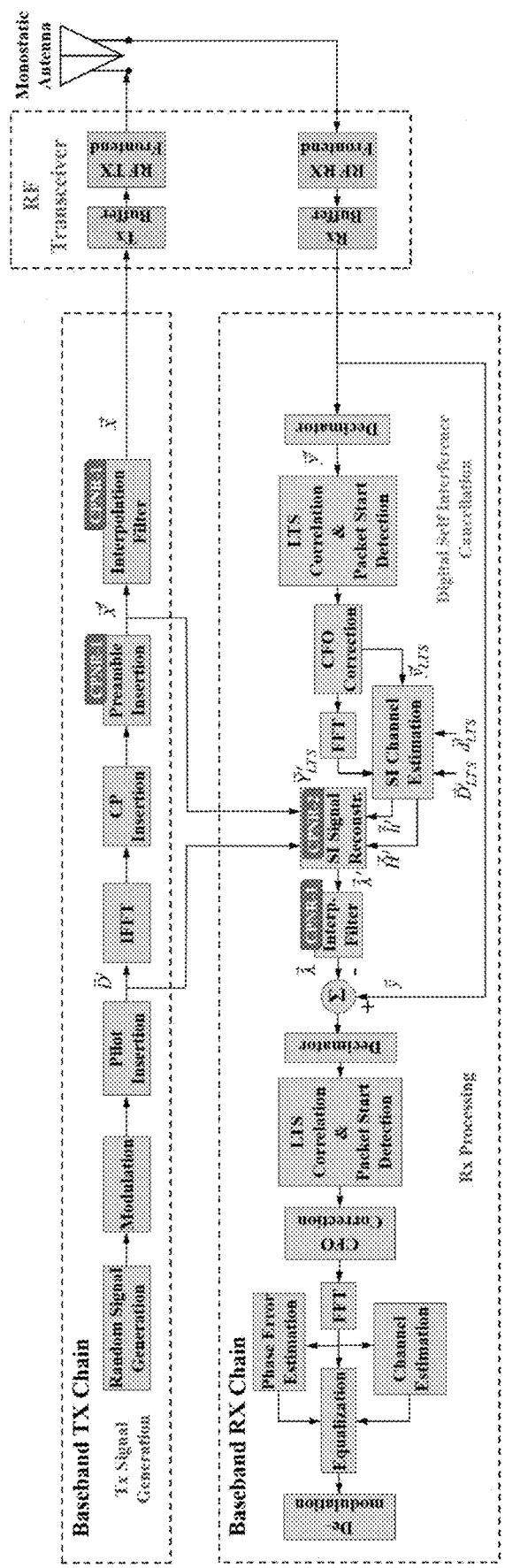

FIG. 10 demonstrates a block diagram of the overall full duplex radio system according to example embodiments.

Figure 11:
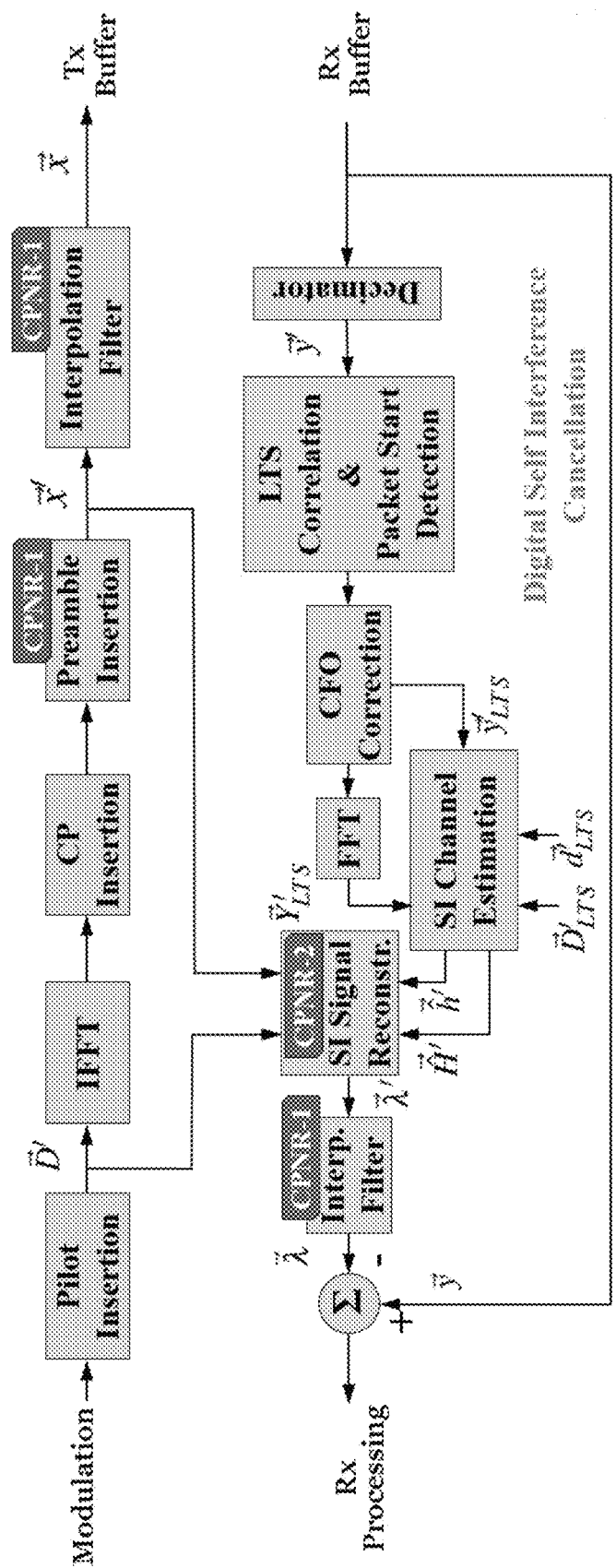

FIG. 11 demonstrates a block diagram of the digital self-interference cancellation subcircuitry capable of cyclic prefix noise reduction according to example embodiments.

DETAILED DESCRIPTION

A novel low-complexity full-duplex radio system includes a monostatic antenna, a digital self-interference cancellation (DSIC) method and circuitry applying said method suitable for orthogonal frequency division multiplexing (OFDM) based full-duplex wireless communications. Said system, method and circuitry applying said method are implementable within the paradigm of in-band full-duplex (IBFD) communication.

A monostatic antenna is described according to the disclosed system. In one embodiment, said monostatic antenna is a dual-polarized slot-coupled patch antenna. Said dual-polarized slot-coupled patch antenna is employed without a circulator/duplexer structure and complex active analog cancellation hardware. Said dual-polarized slot-coupled antenna provides an isolation of over 55 dB in IEEE 802.11g 2.4 GHz wireless band.

Said dual-polarized slot-coupled patch antenna exhibits passive suppression ability of the self-interference signal, having the capacity to provide self-interference suppression up to 60 dB in the standard operational frequency band as denoted above. Said dual-polarized slot-coupled patch antenna comprises one thin quarter-wave microstrip feed line (11) for one polarization while the aperture coupled configuration which excites the antenna through a small slot in the ground plane (14) is used for second polarization. Said dual-polarized slot-coupled patch antenna with such a hybrid feeding mechanism provides improved inter-port isolation as compared to patch antennas with two perpendicular thin quarter-wave microstrip feeds known in the art. For aperture coupled port, the shape and size of aperture in ground plane (15) defines the amount of coupling from feed of ports (12, 13) to radiating antenna patch (10).

According to an embodiment, said dual-polarized slot-coupled patch antenna comprises a quarter-wave feed line as a first port (Tx port (12)). Said quarter-wave feed line is connected to a radiating antenna patch (10) preferably manufactured as a copper layer of dimensions 29 mm×23.6 mm×35 µm. Said radiating antenna patch (10) is preferably centrally positioned on a first 1.6 mm thick FR-4 layer. Said first FR-4 layer is positioned atop a slotted ground plane (15) of dimensions matching thereof; besides which a centrally opened slot of dimensions 1.4 mm×14 mm exists. Said slotted ground plane is situated atop a second 1.6 mm thick FR-4 layer, beneath which a 3 mm wide port line is positioned as a second port (Rx port (13)).

According to an embodiment, said dual-polarized slot-coupled patch antenna is of a structure with optimized dimensions which are of 1.6 mm thick FR-4 substrate. Said dual-polarized slot-coupled patch antenna provides 4.1 dBi and 3.8 dBi gain for microstrip fed port and slot coupled port respectively at 2.4 GHz frequency for each polarization. Microstrip fed port and slot coupled port of said antenna respectively are designated as transmit and receive ports (12, 13).

Said antenna also may be a different monostatic antenna comprising an alternative structure according to other embodiments. In one such embodiment, the monostatic antenna is a dual-polarized differential-fed microstrip patch antenna. Said dual-polarized differential-fed microstrip patch antenna comprises three ports microstrip antenna patch (20), differentially excited through 180-degree ring hybrid coupler(s) for receiver operation to suppress the RF leakage from transmitter port, called passive suppression. Said antenna comprises three ports (22, 23, 25) and one 180-degree ring hybrid coupler (21) on single substrate.

According to one embodiment, said antenna is etched with said one 180-degree ring hybrid coupler (21). Said antenna offers a level of inter-port isolation up to 75 dB at center frequency of 2.4 GHz, in addition to a Tx-Rx isolation level past 65 dB for 50 MHz bandwidth.

According to an embodiment, the monostatic antenna is a double differential-fed, dual-polarized patch antenna. Said antenna comprises four ports radiating antenna patch (30), with differential feeding for both transmit and receive operations. Differential feeding is performed with two identical 3 dB/180-degree ring hybrid couplers (31). Said four-ports radiating antenna patch (30) is etched with a receive ring hybrid coupler (31) on same board, while transmit ring hybrid coupler (31) is externally connected. Said external connection is established through phase matched RF cables (37). Said antenna offers a level of inter-port isolation up to 98 dB at center frequency of 2.4 GHz, in addition to a Tx-Rx isolation levels of 90 dB for 20 MHz and 80 dB for 40 MHz bandwidths.

According to an embodiment, an in-band full-duplex (IBFD) radio architecture, which can convert an Orthogonal Frequency Division Multiplexing (OFDM) based half-duplex (HD) radio into full-duplex, by only using a monostatic i.e. single antenna and a digital self-interference cancellation (DSIC) algorithm is proposed.

According to an embodiment, said radio architecture achieves full-duplex (FD) communication with a low complexity design, employing only a single (monostatic) antenna for passive suppression and digital cancellation, and no additional stages and hardware, unlike architecture known in the art. Existing solutions to the self-interference problem in the art employ multiple antennas or single antenna along with duplexer or circulators for passive suppression, followed by an RF cancellation circuit for active analog suppression before digital cancellation; while disclosed architecture only involves a monostatic (single) antenna for passive suppression and digital cancellation. Disclosed monostatic IBFD architecture achieves up to 99 dB total cancellation for enabling FD communication for low to moderate transmit power levels, i.e., short to medium distance range. (e.g. At 10 dBm transmit power level, 95 dB cancellation achievable. Hence, the SI signal at 10 dBm is reduced to −85 dBm, which is the noise level for the IEEE 802.11 radio.)

According to an embodiment, said low-complexity IBFD radio architecture comprises a simple physical layer access scheme and employs the proposed scheme bidirectional (two way) simultaneous communication between two hypothetical FD nodes.

According to an embodiment, the total throughput of bidirectional communication with the IBFD architecture may be increased to almost twice (1.973 times) that of bidirectional communication with half-duplex radio.

The proposed digital self-interference cancellation (DSIC) method and circuitry for orthogonal frequency division multiplexing (OFDM) centered in-band full-duplex (IBFD) wireless systems is utilizable in concordance with structural isolation of the full-duplex antenna i.e. passive self-interference (SI) suppression, analog self-interference (SI) cancellation or a combination thereof. According to at least one embodiment, one such combination comprises said DSIC circuitry with said dual-polarized slot-coupled patch antenna.

The proposed digital self-interference cancellation (DSIC) method and circuitry are based on orthogonal frequency division multiplexing (OFDM). Said method comprises two steps for cyclic prefix noise reduction (CPNR), respectively as follows: Inserting additional training tones to guard sub-carriers in the communication band covering the transition region effects over the guard sub-carriers along with applying a sharp interpolation filter during interpolation to prevent out-band interference; and, for reconstruction of the transition regions, introducing a novel reconstruction technique to frequency domain reconstruction (FDR).

The digital self-interference cancellation method and circuitry employing the same in the system may be utilized with different types of orthogonal frequency division multiplexing (OFDM) based full-duplex transceivers. Said systems use long training sequence (LTS) symbols tracked via the LTS correlation procedure, and average thereof is utilized to estimate the self-interference (SI) channel in the frequency domain or in time domain, which are respectively referred to as frequency domain estimation (FDE) and time domain estimation (TDE).

According to an embodiment, proposed DSIC circuitry which applies digital cancellation at the baseband stage, follows an antenna suppression of a monostatic, i.e. single antenna. In an embodiment, monostatic antenna, e.g. said dual-polarized slot-coupled patch antenna is followed immediately by a software defined radio element. DSIC circuitry employs least squares along with time and frequency domain estimations/reconstructions according to at least one embodiment. Received baseband signal can be expressed as below:

$$\vec{y} = \vec{x} * \vec{h} + \vec{r} + \vec{w} \quad (1)$$

where vector h represents the impulse response vector for the SI channel acting over the known vector of transmitted samples, vector x; whereas vector r represents signal-of-interest to be received and vector w represents additive white Gaussian noise. Only the SI signal is considered and said known vector of transmitted samples are convolved with the said impulse response vector. Subsequently, according to an embodiment, a decimator downsamples the received signal vector, over the domain thereof estimation and reconstruction takes place.

According to one embodiment, long training sequence (LTS) symbols obtained through LTS correlation procedure applied to downsampled received signal vector are averaged. For the best performance, four LTS symbols are repeated and averaged according to one embodiment. Then, the average of the LTS symbols is used to estimate the SI channel. Reconstructed SI signal vector is a time domain signal, obtained as:

$$\vec{\lambda}' = \text{IFFT}\{\vec{\Lambda}' = \vec{D}' \cdot \hat{\vec{H}}'\} \text{ or } \vec{\lambda}' = \hat{\vec{h}}' * \vec{x}', \quad (2)$$

where the first term and second term of equation (2) represent frequency domain reconstruction and time domain reconstruction respectively. Once the left-hand side of the same equation is interpolated in order to obtain the reconstructed signal, in order to be subtracted from the received signal. After performing subtraction, receiver processing of the signal of interest is performed.

$$\vec{y} - \vec{\lambda} = \vec{r} + \vec{w} + \vec{x}^{res}, \quad (3)$$

where the final term on the right-hand side represents the residual SI signal. Receive processing of the signal of interest (SoI), first term on the right-hand side, is performed, according to an embodiment, with reference to FIG. 1, while considering the signal of interest to be zero for practical purposes, focusing solely on DSIC.

According to embodiment, LS time domain estimation technique is applied for estimating the SI channel and time domain reconstruction is utilized for reconstructing the SI signal, which is denoted as LS-TDE(t). Said technique posits that the channel estimate is calculated by averaging four received LTS symbols, where said average is the convolution of transmitted LTS symbol with the channel impulse response, which can be expressed as a matrix multiplication of the Toeplitz matrix formed by the known transmitted LTS symbol with the channel impulse response in time domain as follows:

$$\vec{y}_{LTS}' = X_{LTS}' \cdot \vec{h}' + \vec{w}_{LTS}' \quad (4)$$

Here, the bold term on the right-hand side is the Toeplitz matrix formed by the known transmitted LTS symbol:

$$X'_{LTS} = \begin{bmatrix} x'_{LTS_{(1)}} & x'_{LTS_{(K)}} & x'_{LTS_{(K-1)}} & \cdots & x'_{LTS_{(K-P+2)}} \\ x'_{LTS_{(2)}} & x'_{LTS_{(1)}} & x'_{LTS_{(K)}} & \cdots & x'_{LTS_{(K-P+3)}} \\ \vdots & \vdots & \vdots & \ddots & \vdots \\ x'_{LTS_{(K-1)}} & x'_{LTS_{(K-2)}} & x'_{LTS_{(K-3)}} & \cdots & x'_{LTS_{(K-P)}} \\ x'_{LTS_{(K)}} & x'_{LTS_{(K-1)}} & x'_{LTS_{(K-2)}} & \cdots & x'_{LTS_{(K-P+1)}} \end{bmatrix}$$

$$\vec{h}' = \begin{bmatrix} h'_1 \\ h'_2 \\ \vdots \\ h'_{P-1} \\ h'_P \end{bmatrix}$$

where K is the size of the fast Fourier transform (FFT) operation, P is the maximum length of the channel impulse response corresponding to the guard interval provided by the cyclic prefix. Such parameters are set according to IEEE 802.11g OFDM system, which is denoted as below:

| Modulation | 16-QAM |
| --- | --- |
| No. of Subcarriers | 52 |
| No. of Pilots | 4 |
| OFDM Symbol duration | 4 µs |
| Guard Interval | 800 ns |
| Signal Bandwidth | 16.66 MHz |
| Subcarrier Spacing | 312.5 kHz |
| FFT Size | 64 |

According to an embodiment, the copy of the SI signal is reconstructed by using the estimated channel and the known transmitted signal. The time domain transmitted samples are convolved with the channel impulse response estimates in order to obtain the reconstructed SI signal in decimation/downsampling domain. The convolution is followed by the interpolation process as the last step of the reconstruction in order to obtain the reconstructed SI signal, which is subsequently subtracted from the received signal in order to cancel the SI signal.

According to an embodiment, the DSIC method used in the system employs a technique of least squares time domain estimation and time domain reconstruction techniques for linear digital cancellation, subsequent to which a cyclic prefix noise reduction technique is employed.

Digital self-interference cancellation (DSIC) involves estimation of the self-interference (SI) channel and reconstruction of said self-interference signal, both processes of which may be performed in time domain or frequency domain. Least squares algorithm, is particularly shown to provide the best performance as well as its lower complexity next to its alternatives. Least squares (LS) frequency domain estimation with time domain reconstruction, LS time domain estimation with time domain reconstruction, LS frequency domain estimation with frequency domain reconstruction, and LS time domain estimation with frequency domain reconstruction are evaluated in detail. Comparatively, especially for frequency domain digital self-interference cancellation (DSIC), periodic signals in form of ripples remain and can be observed on the residual self-interference signal. Said ripples are observed at the transition regions between two OFDM symbols corresponding to the cyclic prefix (CP) region, which is consequently referred to as the cyclic prefix noise (CP noise). The amount and severity of CP noise varies for different DSIC techniques, while it reaches its largest when self-interference cancellation is employed in the frequency domain.

Since the rise on the guard sub-carriers due to CP noise in the transition regions introduces additional non-linearity as intermodulation components throughout the in-band signal, non-linear digital cancellation methods in the art that require long training sequence(s) of OFDM symbols cannot be applied in case of CP noise presence. At any rate, in the art, it is assumed that the communicating nodes are synchronized, so that packets, hence CP regions of said communicating nodes are perfectly aligned, which allows only the payload parts of the content to be evaluated for measuring residual SI, digital and total cancellation. However, when the nodes are not perfectly synchronized or due to propagation delay, the packets may be misaligned, causing the CP noise on the residual SI signal to interfere with the data part of the signal-of-interest (SoI). Therefore, CP noise must be eliminated for all DSIC approaches not only to improve the DSIC performance, but also allow asynchronous operation of full-duplex nodes.

In the art, LS-FDE i.e. least squares frequency domain estimation is achieved by averaging the received long training sequence (LTS) symbols in time domain and converting them into frequency domain by applying Fast Fourier Transform. Then, the channel vector estimate is computed by comparing post-FFT element with the known transmitted LTS symbols assigned to each sub-carrier in frequency domain. Thus, the channel vector estimate in frequency domain and time domain channel impulse response are expressed as:

$$\vec{\tilde{H}}'_{LS\text{-}FDE} = \frac{\vec{Y}'_{LTS}}{\vec{D}'_{LTS}} \rightarrow \vec{\tilde{h}}'_{LS\text{-}FDE} = IFFT\{\vec{\tilde{H}}'_{LS\text{-}FDE}\}. \quad (5)$$

where either first or second left-hand sides of the equations may be used for implementing frequency or time domain reconstructions in the reconstructed SI signal which is a time domain signal obtained in (2).

In time domain SI estimation, the channel is estimated from the averaging of received LTS symbols, represented by the convolution of transmitted known LTS symbol with the channel impulse response. It is further re-expressed as a matrix multiplication of the Toeplitz matrix obtained from the known transmitted LTS symbol with the channel impulse response, as elaborated previously.

$$\vec{\tilde{h}}'_{LS\text{-}TDE} = X'^{\dagger}_{LTS} \cdot \vec{y}'_{LTS} \rightarrow \vec{\tilde{H}}'_{LS\text{-}TDE} = FFT\{\vec{\tilde{h}}'_{LS\text{-}TDE}\}. \quad (6)$$

In the equation (6) above, bold term on the first right-hand side is the Moore-Penrose (pseudo) inverse of the Toeplitz matrix obtained from known transmitted LTS symbols.

Cyclic prefix insertion and preamble attachment processes are applied after obtaining the SI signal. In the time domain reconstruction, the time domain transmitted samples are convolved with the channel impulse response estimates in order to obtain the reconstructed SI signal as in (2). Interpolation process is applied to the reconstructed SI signal as a last step.

Cyclic prefix noise problem in the art appears when the residual signals obtained by DSIC techniques are examined in time domain, especially when frequency domain processing is involved, periodic signals at comparatively high levels are observed in the transition regions from the end of an OFDM symbol to the CP of the next symbol (FIG. 2). This is due to the rise in the guard sub-carriers of the channel as a result of the transition and insufficient estimation of said frequencies at guard sub-carriers. Since the existing channel estimates cannot sufficiently cover the transition regions, the SI signal cannot be reconstructed properly, resulting in the ripples, named as CP noise. As the received SI signal to noise ratio (SNR) is increased, or, when the SI channel root-mean-square delay spread increases, CP noise grows and consequently escalates the detrimental effect on the SoI arriving from the communicated node. When the SoI and residual SI signals are not synchronized, the CP noise appears as added noise on data, resulting in poor reception quality.

In DSIC, SI channel estimation techniques are applied in a similar way as in the traditional OFDM systems as the received LTS is used for channel estimation. LTS symbols are assigned to the data sub-carrier frequencies in the channel. While receiving the full-duplex (FD) signal, initially the starting point of the SI packet is detected by means of performing LTS correlation. Subsequently, the SI channel estimates are obtained. However, the current LTS training symbol does not have sub-carrier assignment in the guard sub-carriers to cope with the high-frequency transitions between two OFDM symbols. This finding brings the necessity for introducing an enhanced SI channel estimation technique for digital self-interference cancellation.

In time domain reconstruction, the entire known transmitted signal is convolved with the channel impulse response as seen in the last term of (2). Therefore, the continuous channel effect can be applied to the transition regions. However, in frequency domain reconstruction, reconstruction rakes place by applying the channel coefficients to the known transmitted signal symbol by symbol as in the first term of (2). After conversion to the time domain, the last parts of the reconstructed symbol are copied and added to the beginning of the related reconstructed symbols as CP. This disturbs the spreading channel effect of the previous OFDM symbol into the next CP symbol in the transition region during reconstruction. When it is subtracted from the received signal, the residual SI signal appears to have additional ripples in these regions generating the CP noise. Therefore, in frequency domain reconstruction, to reduce CP noise, an enhanced reconstruction, to reduce the CP noise, an enhanced reconstruction technique is required along with the enhanced channel estimation.

In the disclosed system, proposed CP noise reduction (CPNR) comprises two steps. First step comprises an enhanced SI channel estimation technique since existing LTS symbol allocation to only the payload sub-carriers in between the guard sub-carriers is insufficient for estimating the transition regions. Second step comprises an enhancement for reconstruction of said transition region.

According to one embodiment, enhanced SI channel estimation technique is directed at OFDM based communication systems such as IEEE 802.11g, wherein sub-carriers at both edges of the channel are kept empty as guard sub-carriers to avoid interfering the out-band signals. In said systems, the transition from OFDM symbol to the next CP raises the guard sub-carriers, thus, the guard sub-carriers are also needed to be filled with a type of training symbols for enhanced SI channel estimation in full-duplex. However, a limitation exists against insertion of further tones to the guard sub-carriers, since existing filter is not flat for the guard sub-carriers in the transition band. Furthermore, when all the empty tones are filled, an ideal sharp filter is required for suppressing the out-of-band signals, which is practically difficult to implement.

Enhanced SI channel estimation according to the disclosed system also proposes a new sharp interpolation filter, flat over added more tones at the guard sub-carriers, however, suppresses the image tones created by upsampling. Also, the proposed filter manages to prevent the inter-symbol interference (ISI) problem in time domain, albeit having a longer group delay compared to the existing interpolation filter. The filter in the disclosed system is a general linear-phase finite impulse response (FIR) filter employing least-squares error minimization and it involves a band-limited factor defining the broadening of the Nyquist frequency over an ideal filter. Proposed filter is defined by 127 coefficients whereas filters in the art have 43 coefficients, insufficient for covering extra tone insertion. Autocorrelation property of the new LTS after adding extra training tones is not disturbed. Moreover, out-band suppression of the proposed filter is 20 dB better compared to the existing interpolation filter in the art.

According to one embodiment, enhanced frequency domain reconstruction is executed. At the transmitter, the CP symbol is extracted from the last samples of $$\vec{x}'_{trans,i} = \bigsqcup_{n=PS-(K-K_{CP})+(i-1)K_{SYM}}^{PS+K_{CP}+(i-1)K_{SYM}} \vec{x}'(n) \tag{7}$$

the related OFDM symbol and appended to the beginning. However, at the receiver side, after SI channel estimation, it becomes necessary to reconstruct the CP symbol together with the previous OFDM symbol, instead of directly extracting it from the reconstructed OFDM symbol itself in frequency domain reconstruction. By utilizing this approach, CP noise is eliminated from the residual signal. First step in reconstructing the CP part of the SI signal is extracting the transition region from the transmit signal.

where left-hand side of the equation contains the i'th cyclic prefix of the respective OFDM symbol at the end, and it contains the last part of the (i−1)'th OFDM symbol at the beginning. PS is the packet start index indicating the starting point of the payload section. K is the number of samples in one OFDM symbol in time domain and it is also the FFT/IFFT size, corresponding to the number of sub-carriers in frequency domain. K-sub-CP is the number of cyclic prefix samples extracted from the last part of the OFDM payload symbol, so that K-sub-SYM equals K and K-sub-cp added together. The disjoint union (concatenation) of the samples is subsequently obtained to construct a vector.

The frequency domain representation of the transition region is obtained by taking the K-point FFT of the index-wise cyclic prefixes of respective OFDM symbols on the left-hand side of (4). Then, the first term of (2) is applied as follows in order to reconstruct the transition region:

$$\vec{\lambda}_{trans,i}' = IFFT\{\vec{\Lambda}_{trans,i}' = \vec{X}_{trans,i}' \cdot \hat{\vec{H}}'\}. \tag{8}$$

As the next step, the reconstructed CP samples are extracted from the last K-sub-CP samples of transition region obtainable above. Reconstruction of the payload symbol is again performed using (2), whereby utilizing the known payload symbol of D-prime vector. Then, the reconstructed CP and the reconstructed payload are concatenated back to back to obtain:

$$\vec{x}'_{CP,i} = \bigsqcup_{n=K-K_{CP}+1}^{K} \vec{x}'_{trans,i}(n), \vec{x}'_{data,i} = IFFT\{\vec{D}'_i \cdot \hat{\vec{H}}'\}, \tag{9}$$

$$\vec{x}'_i = \vec{x}'_{CP,i} ++ \vec{x}'_{data,i}. \tag{10}$$

Here, double plus operator concatenates two vectors. Finally, whole reconstructed OFDM packet is obtained as:

$$\vec{x}' = \bigsqcup_{i=1}^{N_{STS}} \vec{x}'_{STS,i} ++ \vec{x}'_{LCP} ++ \bigsqcup_{i=1}^{N_{STS}} \vec{x}'_{LTS,i} ++ \bigsqcup_{i=1}^{N} \vec{x}'_i.$$

where short training symbols (STS) to CP of LTS transition are corrected once following the same steps as in equations (7), (8) and (9) successively and hence LCP is obtained. N-sub-STS is the number of STS symbols, N-sub-LTS is the number of LTS symbols and N is the number of payload symbols. Then, the result is interpolated and SI signal is obtained to be subtracted from the received signal in (3).

In embodiments, a full-duplex radio system for in-band full-duplex wireless communication, comprising a single antenna and digital self-interference cancellation circuitry is proposed.

In at least one embodiment, said single antenna is a monostatic antenna.

In at least one embodiment, said digital self-interference cancellation circuitry comprises a processor configured to execute a least-square based digital self-interference cancellation method of orthogonal frequency division multiplexing that attenuates cyclic prefix noise.

In at least one embodiment, said monostatic antenna is a dual port, dual polarized microstrip patch antenna with hybrid feeding.

In at least one embodiment, said dual port, dual polarized microstrip patch antenna with hybrid feeding comprises one aperture coupled port and one thin quarter-wave microstrip fed port.

In at least one embodiment, said monostatic antenna is a dual port, dual polarized patch antenna with differential feeding.

In at least one embodiment, said dual port, dual polarized differential fed patch antenna comprises a three-port antenna and a 180-degree ring hybrid coupler, whereby radio frequency leakage is suppressed.

In at least one embodiment, said monostatic antenna is a dual polarized, double differential fed patch antenna.

In at least one embodiment, said dual polarized, double differential fed patch antenna comprises a four-port antenna and two 180-degree ring hybrid couplers, whereby radio frequency leakage is suppressed.

In at least one embodiment, said processor of said digital self-interference cancellation circuitry is further configured to implement a least-squares algorithm with time or frequency domain estimation; and time or frequency domain reconstruction.

In embodiments, digital self-interference cancellation method for in-band full-duplex wireless communication is proposed.

In embodiments there exists a step of decimation; where a signal received at a full-duplex antenna is collected through a software defined radio and downsampled.

In embodiments, there exists a step of LTS correlation and packet start detection; where LTS symbols are tracked and packet starts are detected.

In an embodiment there exists a step of CFO correction; wherein carrier frequency offset is corrected.

In embodiments, there exists a step of FFT; wherein fast Fourier transform is applied.

In embodiments, there exists a step of enhanced SI channel estimation; where self-interference channel is estimated according to OFDM symbols and a sharp interpolation filter is applied.

In embodiments, there exists a step of enhanced frequency domain reconstruction; where cyclic prefix noise is eliminated from a residual signal wherein cyclic prefix symbol is reconstructed with the previous OFDM symbol.

The methods, devices, processing, circuitry, and logic described above may be implemented in many different ways and in many different combinations of hardware and software. For example, all or parts of the implementations may be circuitry that includes an instruction processor, such as a Central Processing Unit (CPU), microcontroller, and/or a microprocessor; and/or as an Application Specific Integrated Circuit (ASIC), Programmable Logic Device (PLD), and/or Field Programmable Gate Array (FPGA); and/or circuitry that includes discrete logic or other circuit components, including analog circuit components, digital circuit components or both; or any combination thereof. The circuitry may include discrete interconnected hardware components or may be combined on a single integrated circuit die, distributed among multiple integrated circuit dies, or implemented in a Multiple Chip Module (MCM) of multiple integrated circuit dies in a common package, as examples.

Accordingly, the circuitry may store or access instructions for execution, or may implement its functionality in hardware alone. The instructions may be stored in a tangible storage medium that is other than a transitory signal, such as a flash memory, a Random Access Memory (RAM), a Read Only Memory (ROM), an Erasable Programmable Read Only Memory (EPROM); or on a magnetic or optical disc, such as a Compact Disc Read Only Memory (CDROM), Hard Disk Drive (HDD), or other magnetic or optical disk; or in or on another machine-readable medium. A product, such as a computer program product, may include a storage medium and instructions stored in or on the medium, and the instructions when executed by the circuitry in a hardware computer may cause the hardware computer to implement any of the processing described above or illustrated in the drawings.

The implementations and functionality of the circuitry may be distributed. For instance, the circuitry may include multiple distinct system components, such as multiple processors and memories, and may span multiple distributed processing systems. Parameters, databases, and other data structures may be separately stored and managed, may be incorporated into a single memory or database, may be logically and physically organized in many different ways, and may be implemented in many different ways. Example implementations include linked lists, program variables, hash tables, arrays, records (e.g., database records), objects, and implicit storage mechanisms. Instructions may form parts (e.g., subroutines or other code sections) of a single program, may form multiple separate programs, may be distributed across multiple memories and processors, and may be implemented in many different ways. Example implementations include stand-alone programs, and as part of a library, such as a shared library like a Dynamic Link Library (DLL). The library, for example, may contain shared data and one or more shared programs that include instructions that perform any of the processing described above or illustrated in the drawings, when executed by the circuitry.

The subject-matter of the disclosure may also relate, among others, to the following aspects:

1) A full-duplex radio system for in-band full-duplex wireless communication, comprising a single antenna and digital self-interference cancellation module characterized in that;

said single antenna is a monostatic antenna; and, said digital self-interference cancellation module comprises a processor configured to execute a least-square based digital self-interference cancellation method of orthogonal frequency division multiplexing that attenuates cyclic prefix noise.

2) A full-duplex radio system for in-band full-duplex wireless communication as set forth in aspect 1 characterized in that said monostatic antenna is a dual port, dual polarized microstrip patch antenna with hybrid feeding.

3) A full-duplex radio system for in-band full-duplex wireless communication as set forth in aspect 2 characterized in that said dual port, dual polarized microstrip patch antenna with hybrid feeding comprises one aperture coupled port and one thin quarter-wave microstrip fed port.

4) A full-duplex radio system for in-band full-duplex wireless communication as set forth in aspect 1 characterized in that said monostatic antenna is a dual port, dual polarized patch antenna with differential feeding.

5) A full-duplex radio system for in-band full-duplex wireless communication as set forth in aspect 4 characterized in that said dual port, dual polarized differential fed patch antenna comprises a three-port antenna and a 180-degree ring hybrid coupler, whereby radio frequency leakage is suppressed.

6) A full-duplex radio system for in-band full-duplex wireless communication as set forth in aspect 1 characterized in that said monostatic antenna is a dual polarized, double differential fed patch antenna.

7) A full-duplex radio system for in-band full-duplex wireless communication as set forth in aspect 6 characterized in that said dual polarized, double differential fed patch antenna comprises a four-port antenna and two 180-degree ring hybrid couplers, whereby radio frequency leakage is suppressed.

8) A full-duplex radio system for in-band full-duplex wireless communication as set forth in any preceding aspect (1-7) characterized in that said processor of said digital self-interference cancellation module is further configured to implement a least-squares algorithm with time or frequency domain estimation; and time or frequency domain reconstruction.

9) A digital self-interference cancellation method for in-band full-duplex wireless communication, comprising steps of;

decimation; where a signal received at a full-duplex antenna is collected through a software defined radio and downsampled, LTS correlation and packet start detection; where LTS symbols are tracked and packet starts are detected, CFO correction; wherein carrier frequency offset is corrected, FFT; wherein fast Fourier transform is applied, enhanced SI channel estimation; where self-interference channel is estimated according to OFDM symbols and a sharp interpolation filter is applied, and enhanced frequency domain reconstruction; where cyclic prefix noise is eliminated from a residual signal wherein cyclic prefix symbol is reconstructed with the previous OFDM symbol.

While various embodiments have been described, it will be apparent to those of ordinary skill in the art that many more embodiments and implementations are possible. Accordingly, the embodiments described herein are examples, not the only possible embodiments and implementations.

The invention claimed is:

1. A full-duplex radio system comprising:
a single antenna and digital self-interference cancellation circuitry for in-band full-duplex wireless communication,
wherein said single antenna is a monostatic antenna, wherein said monostatic antenna comprises a dual port, dual polarized microstrip patch antenna with hybrid feeding; and,
wherein said digital self-interference cancellation circuitry comprises a processor configured to execute a least-square based digital self-interference cancellation method of orthogonal frequency division multiplexing that attenuates cyclic prefix noise.

2. The full-duplex radio system as set forth in claim 1, wherein said dual port, dual polarized microstrip patch antenna with hybrid feeding comprises one aperture coupled port and one thin quarter-wave microstrip fed port.

3. A full-duplex radio system comprising:
a single antenna and digital self-interference cancellation circuitry for in-band full-duplex wireless communication,
wherein said single antenna is a monostatic antenna, said monostatic antenna is a dual port, dual polarized patch antenna with differential feeding; and
wherein said digital self-interference cancellation circuitry comprises a processor configured to execute a least-square based digital self-interference cancellation method of orthogonal frequency division multiplexing that attenuates cyclic prefix noise.

4. The full-duplex radio system as set forth in claim 3, wherein said dual port, dual polarized differential fed patch antenna comprises a three-port antenna and a 180-degree ring hybrid coupler, whereby radio frequency leakage is suppressed.

5. A full-duplex radio system comprising:
a single antenna and digital self-interference cancellation circuitry for in-band full-duplex wireless communication,
wherein said single antenna is a monostatic antenna, wherein said monostatic antenna is a dual polarized, double differential fed patch antenna; and
wherein said digital self-interference cancellation circuitry comprises a processor configured to execute a least-square based digital self-interference cancellation method of orthogonal frequency division multiplexing that attenuates cyclic prefix noise.

6. The full-duplex radio system as set forth in claim 5, wherein said dual polarized, double differential fed patch antenna comprises a four-port antenna and two 180-degree ring hybrid couplers configured to suppress radio frequency leakage.

7. A full-duplex radio system comprising:
a single antenna and digital self-interference cancellation circuitry for in-band full-duplex wireless communication,
wherein said single antenna is a monostatic antenna;
wherein said digital self-interference cancellation circuitry comprises a processor configured to execute a least-square based digital self-interference cancellation method of orthogonal frequency division multiplexing that attenuates cyclic prefix noise; and
wherein said processor of said digital self-interference cancellation circuitry is further configured to implement a least-squares algorithm with time or frequency domain estimation; and time or frequency domain reconstruction.

8. A digital self-interference cancellation method for in-band full-duplex wireless communication, comprising the steps of:
signal decimation; where a signal received at a full-duplex antenna is collected through a software defined radio and downsampled to create a decimated signal,
applying long training sequence (LTS) correlation and packet start detection to the decimated signal; where LTS symbols are tracked and packet starts are detected,
carrier frequency offset (CFO) correction; wherein a carrier frequency of the decimated signal is offset corrected for the software defined radio,
fast Fourier transformation (FFT); wherein fast Fourier transform is applied to the offset decimated signal,
enhanced self-interference (SI) channel estimation; where a self-interference channel is estimated according to orthogonal frequency division multiplexing (OFDM) symbols and a sharp interpolation filter is applied, and
enhanced frequency domain reconstruction; where cyclic prefix noise is eliminated from a residual signal, wherein the cyclic prefix noise is reconstructed with the OFDM symbols.

* * * * *